(12) United States Patent
Ide et al.

(10) Patent No.: US 8,897,994 B2
(45) Date of Patent: Nov. 25, 2014

(54) EXHAUST GAS RECIRCULATION CONTROL DEVICE OF INTERNAL COMBUSTION ENGINE

(75) Inventors: Kazunari Ide, Tokyo (JP); Hiroyuki Endo, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 369 days.

(21) Appl. No.: 13/388,106

(22) PCT Filed: Jun. 11, 2010

(86) PCT No.: PCT/JP2010/059942
§ 371 (c)(1),
(2), (4) Date: Jan. 31, 2012

(87) PCT Pub. No.: WO2011/099174
PCT Pub. Date: Aug. 18, 2011

(65) Prior Publication Data
US 2012/0125301 A1    May 24, 2012

(30) Foreign Application Priority Data
Feb. 9, 2010 (JP) ................................. 2010-026472

(51) Int. Cl.
| | |
|---|---|
| F02D 41/24 | (2006.01) |
| F02M 25/07 | (2006.01) |
| F02D 41/00 | (2006.01) |
| F02D 41/14 | (2006.01) |
| F02D 41/10 | (2006.01) |
| F02D 41/18 | (2006.01) |

(52) U.S. Cl.
CPC ...... *F02D 41/005* (2013.01); *F02D 2041/0017* (2013.01); *F02D 2200/0414* (2013.01); *F02D 41/1458* (2013.01); *F02D 41/107* (2013.01); *F02D 41/18* (2013.01); *F02D 2200/0614* (2013.01); *F02D 2041/141* (2013.01); *F02D 2200/101* (2013.01); *F02D 2041/1409* (2013.01); *Y02T 10/47* (2013.01); *F02M 25/0707* (2013.01); *F02D 2200/0406* (2013.01); *F02D 41/1401* (2013.01)
USPC ...................................... 701/108; 123/568.21

(58) Field of Classification Search
CPC ... F02D 41/005; F02D 41/1401; F02D 41/18; F02D 2041/0017; F02D 2041/1409; F02D 2041/141; F02M 25/07
USPC ...................................... 123/568.21; 701/108
See application file for complete search history.

(56) References Cited

U.S. PATENT DOCUMENTS

| | | | | |
|---|---|---|---|---|
| 8,463,531 | B2 * | 6/2013 | Ramappan et al. | ........... 701/108 |
| 8,615,997 | B2 * | 12/2013 | Ejiri et al. | .................... 60/605.2 |

FOREIGN PATENT DOCUMENTS

| | | |
|---|---|---|
| EP | 0 745 762 A2 | 12/1996 |
| EP | 0 750 103 A2 | 12/1996 |

(Continued)

OTHER PUBLICATIONS

International Search Report issued Jul. 6, 2010 in corresponding International Application No. PCT/JP2010/059942.

(Continued)

*Primary Examiner* — Hai Huynh
(74) *Attorney, Agent, or Firm* — Wenderoth, Lind & Ponack, L.L.P.

(57) ABSTRACT

An exhaust gas recirculation control device is provided with a feedback control unit and a feed-forward control unit, wherein the device is provided with: an adder which adds a feed-forward control command signal to a feedback control command signal; and a maximum selection function-section which compares an added value obtained by the adder with a feed-forward control command signal or a command signal from an EGR valve maximum opening map, and selects the command signal by which the valve opening of the EGR control valve is brought to a closed side, wherein the command signal by which the valve opening of the EGR control valve is brought to an opened side is not outputted.

6 Claims, 10 Drawing Sheets

(56) References Cited

FOREIGN PATENT DOCUMENTS

| | | |
|---|---|---|
| JP | 2832422 | 10/1998 |
| JP | 2832423 | 10/1998 |
| JP | 2008-138537 | 6/2008 |
| JP | 2008-519196 | 6/2008 |
| JP | 2009-150331 | 7/2009 |
| JP | 2009-281261 | 12/2009 |
| WO | 02/081888 | 10/2002 |
| WO | 2006/050383 | 5/2006 |

OTHER PUBLICATIONS

Notice of Allowance issued May 7, 2013 in corresponding Korean Application No. KR10-2012-7000907 (with English translation).

Decision to grant a patent, with English translation, issued Aug. 2, 2013 in corresponding Japanese Patent Application No. 2010-026472.

International Preliminary Report on Patentability and Written Opinion of the International Searching Authority issued Sep. 18, 2012 in corresponding International Application No. PCT/JP2010/059942 (with English translation).

* cited by examiner

EXHAUST GAS RECIRCULATION CONTROL DEVICE OF INTERNAL COMBUSTION ENGINE

BACKGROUND OF THE INVENTION

1. Field of the Invention

The present invention relates to an exhaust gas recirculation device of an internal combustion engine.

2. Background of the Invention

As a measure to reduce NOx emission from an internal combustion engine, it has been a conventional practice to provide the internal combustion engine with an EGR (Exhaust Gas Recirculation) device.

Thereby, an EGR gas control valve for controlling the flow rate of an EGR gas is conventionally provided in an EGR gas passage which connects an exhaust gas passage to an intake air passage; the opening of the EGR control valve is controlled by a feedback correction device so that the opening of the EGR control valve follows a target opening that is determined in response to the operation condition of the internal combustion engine.

However, in a transient operation condition, it is not always possible to perform the operation under a pertinent target opening condition. In a case where the target opening steeply increases, what they call an overshoot or undershoot of the valve opening occurs for a while after the actual opening level reaches the target opening level; namely, in the overshoot or the undershoot of the valve opening, the actual opening goes or returns to an excessive degree. In this event, when the valve opening overshoots toward an opening excess side, the EGR gas of an excess flow rate over a required flow rate determined on the basis of the target opening is supplied. Thus, there may be a problem that the smoke generated in the gas emitted from the exhaust gas passage increases.

On the contrary, when the valve opening is steeply decreased, the undershoot in which the valve opening decreases toward an opening shortage side so that the EGR gas of an insufficient flow rate below a required flow rate determined on the basis of the target opening. In this event, the flow rate of the EGR gas to be supplied becomes insufficient in comparison with the required flow rate is supplied.

Figure 11:
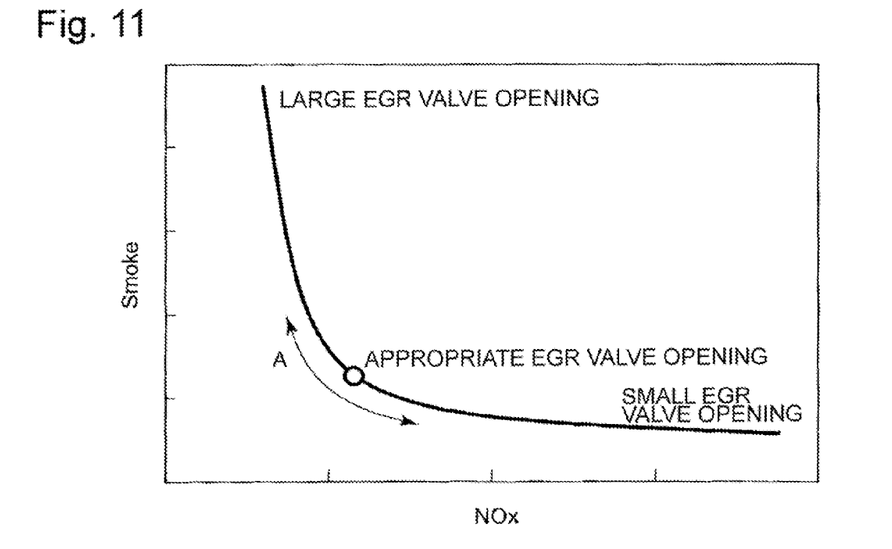
FIG. 11 explains a relationship between NOx emission and smoke emission along the change of the opening of the EGR valve.

In addition, as shown in FIG. 11, the relationship between the NOx emission amount and the smoke emission amount shows a trade-off relation. Incidentally, the smoke described above includes PM (particular matter).

In this way, it becomes important to provide a technology which shows how the actual valve opening follows the target valve opening without the overshoot or the undershoot after the target opening of the EGR control valve is prescribed.

As for the technology by which the actual valve opening follows the target valve opening without overshoot or undershoot, Patent Reference 1 (JP2832422) and Patent Reference 2 (JP2832423) are known.

Patent Reference 1 (JP2832422) shows a technology by which the overshoot of the EGR control valve opening is prevented so that the integral control action of a PI controller performing a feedback control is not executed (i.e. the integrated value is set as 0) in a situation where the rate of change of the target opening for the EGR control valve is great or in a situation where the deviation between the target opening and the actual opening is increased.

Further, Patent Reference 2 (JP2832423) discloses a control device provided with:

a feedback correction unit by which a feedback correction is performed so that the actual EGR control valve opening follows the target opening; and a feed-forward correction unit by which a feed-forward correction is performed so that the target opening is achieved, wherein the correction action by the feed-forward correction unit is constrained when the target opening is comparatively smaller in comparison with a case where the target opening is at a greater level; or the correction action by the feed-forward correction unit is increased when the absolute value of the difference between a target opening and an actual opening of an EGR gas control valve is comparatively greater in comparison with a case where the absolute value of the difference is at a smaller level.

REFERENCES

Patent References

Patent Reference 1: JP2832422
Patent Reference 2: JP2832423

SUMMARY OF THE INVENTION

Subjects to be Solved

In an exhaust gas recirculation device, even when the control command is corrected by use of a feedback correction unit as described in Patent Reference 1, the actual deviation between a target valve opening and an actual valve opening cannot be small just after the target opening is changed. Thus, as described in Patent Reference 2, under a condition that a correction by use of a feed-forward correction unit is executed, the deviation from the target valve opening is made as small as possible by strengthening the correction effect by use of the feed-forward correction unit in a case where the target valve opening is small or the difference from the actual valve opening is great.

However, in the technology as shown in Patent Reference 2, in order to judge whether or not the correction by the feed-forward correction unit should be executed, a special control flow is required so that the correction by the feed-forward correction unit is executed via an interrupt handling at every predetermined time interval. Thus, there arises a problem that the processes of the control flow to be executed become complicated.

Further, Patent Reference 2 only discloses when to use the feedback control unit and when to use the feed-forward control unit; in other words, Patent Reference 2 does not disclose a contrivance in which a feedback correction unit and a feed-forward correction unit are used at the same time so that a correction factor as an aggregation of a correction factor of the feedback correction unit and a correction factor of the feed-forward correction unit is used for realizing a control in which the target valve opening is followed with a high tracking performance.

In view of the problems as described above, the present invention aims at providing an exhaust gas recirculation control device of an internal combustion engine, wherein, with simple control logic, an overshoot or an undershoot regarding the target valve opening of an EGR control valve can be prevented, and the target-opening tracking performance as well as the reliability is enhanced.

Means to Solve the Subjects

In order to solve the problems as described above, the present invention provide an exhaust gas recirculation control device of an internal combustion engine, the device including, but not limited to:

an EGR control valve which controls the flow rate of EGR gas and is provided in an EGR gas passage connecting an exhaust gas passage to an intake air passage;

a feedback control unit which outputs a feedback control command signal to control the opening of the EGR control valve, in response to the operation conditions of the internal combustion engine; and a feed-forward control unit which outputs a feed-forward control command signal, wherein the device includes, but not limited to:

an adding unit which adds a control command signal from the feed-forward control unit to a control command signal from the feedback control unit; and a selection unit which compares an added value obtained by the adding unit with a limitation signal for the maximum opening of the EGR control valve, and selects the command signal by which the valve opening of the EGR control valve is brought to a closed side, wherein the command signal by which the valve opening of the EGR control valve is brought to an opened side is not outputted.

According to the present invention as described above, the selection unit selects the command signal by which the valve opening of the EGR control valve is brought to a closed side, out of the limitation signal for the maximum opening of the EGR control valve and the aggregated signal obtained by adding the control command signal from the feed-forward control unit to the control command signal from the feedback control unit. And, the command opening value which is, toward an open side, greater than the opening determined by the limitation signal of the EGR control valve maximum opening is not outputted. Thus, in the transient operation condition, the EGR control valve can be prevented from being opened greatly than necessary, whereby the excessively opened condition is caused by the transient response of the feedback control (unit); in this way, the smoke generation due to excessive recirculation of exhaust gas can be prevented.

In other word, the valve opening is restricted by the maximum limitation signal for the maximum opening of the EGR control valve. Hence, even when the feedback control command signal transiently overshoots the feedback control target signal, the EGR control valve opening is prohibited from being opened toward an open side over the maximum opening by the maximum limitation signal. In this way, the EGR control valve can be prevented from being opened greatly than necessary; and an excessive recirculation of exhaust gas can be prevented. Thus, as shown in a characteristic graph of FIG. 11, the movement in the A-direction on the characteristic graph can be avoided so as to prevent the smoke generation.

Further, in a case where the aggregated signal obtained by adding the control command signal from the feed-forward control unit and the control command signal from the feedback control unit is selected, not a simple feedback control but the feedback control integrated with a feed-forward control is performed. Thus, the tracking performance for the target opening can be enhanced.

Further, a preferable embodiment of the present invention is the exhaust gas recirculation control device of an internal combustion engine, wherein the control command signal from the feed-forward control unit is inputted, as a limitation signal for the maximum opening of the EGR control valve, into the selection unit.

In this way, the control command signal from the feed-forward control unit forms the limitation signal for the maximum opening of the EGR control valve; thus, the overshoot can be surely prevented with a simple configuration.

Further, the control command signal from the feed-forward control unit is inputted into the selection unit as the limitation signal for the maximum opening of the EGR control valve. Thus, the change-over between the control by the aggregation of the feed-forward control command signal and the feedback control command signal, and the control by the feed-forward control command signal can be simply performed.

To be more specific, by intentionally changing and setting the feedback control target signal for computing the feedback control command signal, for instance, by setting the data of a feedback control target map at a data which is intentionally changed from a desirable data (suitable values for operation conditions) in a case of a low load operation range, the selection unit can select only the feed-forward control command signal in the low load operation range. Thus, with simple control logic, the change-over between the control only by the feed-forward control command signal and the control by the aggregation of the feed-forward control command signal and the feedback control command signal can be performed.

In addition, in the low load range, air excess ratio is high and smoke is difficult to be generated. Thus, it is not necessary to perform the feedback control of the EGR control valve, and only the feed-forward control sufficiently works. Further, in the low load range, the fuel injection quantity is small. And, the change of oxygen excess ratio in response to a condition change is great. Accordingly, when the feedback control is performed in this event, there may be a problem that the behavior repeatability of the EGR control valve is spoiled. Hence, the feedback control is not suitable in this event.

On the other hand, in a high load range where the air excess ratio is reduced, in order to achieve the feedback control target signal (a target air excess ratio as the feedback control target signal for the EGR), it is required to control the EGR control valve with high accuracy and high responsiveness. Hence, the feedback control becomes necessary in the high load range.

Accordingly, in the present invention as described above, the feedback control target signal is intentionally changed for each operation load range; in the low load range, the feed-forward control is selected, whereas the control by the aggregation of the feed-forward control command signal and the feedback control command signal is selected. In this way, two kinds of control approaches can be changed-over with simple control logic.

Further, another preferable embodiment of the present invention is the exhaust gas recirculation control device of an internal combustion engine, wherein a limitation signal for the maximum opening of the EGR control valve is of a value calculated by use of an EGR valve maximum opening map which is set in response to engine operation conditions and environment conditions.

In the present invention as described above, in a case where the control command signal from the feed-forward control unit is used as a limiting signal, there may be a case where an appropriate limiting cannot be performed when the environmental condition greatly changes. For instance, in a case where the atmospheric temperature changes toward a higher level, the combustion temperature increases in response to the atmospheric temperature increase and the NOx emission amount increases. Hence, it becomes necessary to establish the limiting level of the maximum opening of the EGR valve at an open side; however, since the control command signal from the feed-forward control unit is established at a level based on a standard atmospheric condition, the feed-forward control command signal cannot sufficiently work under such a change of the environment condition. As described in the present invention above, by establishing the limiting level by use of the EGR valve maximum opening map which is configured in response to the engine operation conditions and the environmental conditions, the overshoot phenomenon can be surely prevented while the NOx emission amount can be constrained.

Further, another preferable embodiment of the present invention is the exhaust gas recirculation control device of an internal combustion engine, wherein the feedback control command signal is which is set by a PID (proportional, integral and differential) operation based on a calculated air excess ratio of the internal combustion engine as well as based on a target air excess ratio as a feedback control target value previously established in response to engine operation conditions.

According to the above-described embodiment, by using the air excess ratio as the feedback control target signal of the EGR in response to the operation conditions, the condition of the valve opening of the EGR can be appropriately expressed.

Further, another preferable embodiment of the present invention is the exhaust gas recirculation control device of an internal combustion engine, wherein:

the device includes, but not limited to, a valve opening limiter of the EGR control valve; and the feedback control unit is provided with an auto-tuning PID unit based on the deviation between the output signal of the valve opening limiter and the output signal of the adding unit.

As described above, by providing the auto-tuning PID as a wind-up countermeasure (an input saturation countermeasure) for the feedback control unit, the integrator in the PID operation section of the feedback control unit is prevented from continuing to accumulate the integrated results while the selection unit selects the feed-forward control command signal. In this way, the tracking performance in a case where the target signal level of the feedback control is changed can be enhanced, and the cleaning performance regarding the exhaust gas under a transient operation can be prevented from being spoiled.

Further, even in a case where the control command signal for the EGR valve sticks to an end of the opening range of the EGR valve, namely, a ceiling limit of the valve opening limiter, the integrator in the PID operation section is prevented from continuing to accumulate the integrated results. In this way, the tracking performance in a case where the target signal level of the feedback control is changed can be enhanced, and the cleaning performance regarding the exhaust gas under a transient operation can be prevented from being spoiled.

Further, another preferable embodiment of the present invention is the exhaust gas recirculation control device of an internal combustion engine, wherein:

the device includes, but not limited to, a transient case control unit which controls the EGR control valve so that the EGR control valve is closed toward a minimal opening or a fully closed condition for a certain period during a transient operation; and a transient case selection unit which selects one of the output signal of the selection unit and the output signal of the transient case control unit so that the selected signal is outputted to valve opening limiter.

Even when the transient case control unit is provided as described above, the auto-tuning PID as a windup countermeasure (an input saturation countermeasure) is arranged in a case where the condition under which the transient case control unit controls the EGR control valve is released. Accordingly, the windup (an input saturation) is prevented from occurring. Therefore, an adverse effect due to an addition of an optional logic such as the transient case control unit can be avoided.

In other words, under a condition that the transient case control unit is provided, in order to constrain the smoke generation during the transient operation, even when a control logic by which the EGR control valve is fully closed for a certain duration of time or a control logic by which the opening of the EGR control valve is placed at a minimal level is optionally added, the adverse effect due to the auto-tuning PID during the transient situation where the control by the transient case control unit is released is avoided.

Effects of the Invention

According to the present invention, the overshoot of the EGR control valve opening relative to the target valve opening can be prevented; the smoke generation due to the excessive opening of the EGR control valve can be prevented; and the tracking performance as well as the reliability of the EGR control valve can be enhanced.

Further, the feedback control command signal and the feed-forward control command signal are computed in response to the operation conditions of the internal combustion engine. Thus, by intentionally changing and setting the feedback control target signal for computing the feedback control command signal, for instance, by setting the data of a feedback control target map at a data which is intentionally changed from a desirable data in a case of a low load operation range, the selection unit can be set so as to select only the feed-forward control command signal in the low load operation range. In this way, with simple control logic, the changeover between the control only by the feed-forward control command signal and the control by the aggregation of the feed-forward control command signal and the feedback control command signal can be performed.

BRIEF DESCRIPTION OF THE DRAWINGS

The present invention will now be described in greater detail with reference to the modes of the present invention, the preferred embodiments of the present invention and the accompanying drawings, wherein:

FIGS. 4(a) and 4(b) explain a simulation confirmation according to the first mode;

DETAILED DESCRIPTION OF THE PREFERRED MODES AND EMBODIMENTS

Hereafter, the present invention will be described in detail with reference to the modes or embodiments shown in the figures. However, the dimensions, materials, shape, the relative placement and so on of a component described in these modes or embodiments shall not be construed as limiting the scope of the invention thereto, unless especially specific mention is made.

(First Mode)

Figure 1:
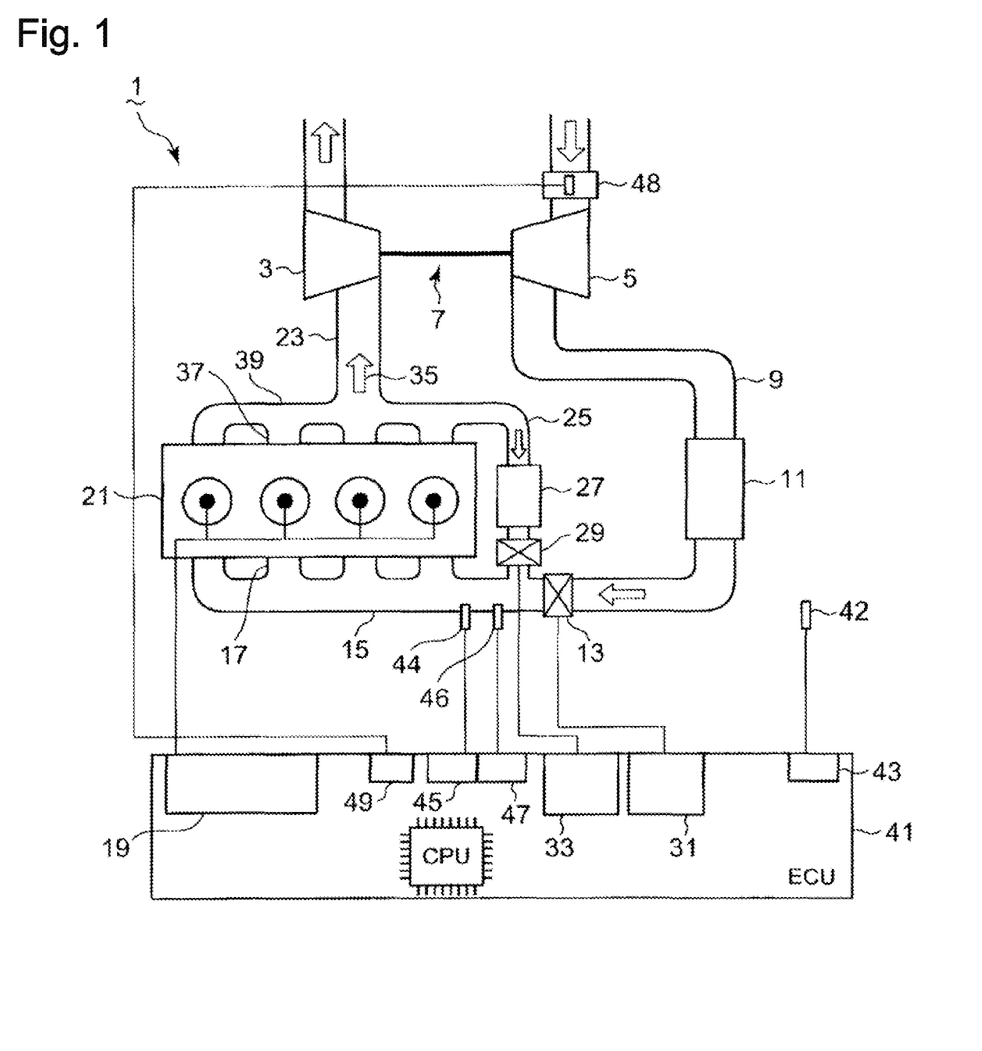
FIG. 1 shows an outline configuration of an exhaust gas recirculation control device according to a first mode of the present invention.

Based on FIG. 1, an exhaust gas recirculation control device of an internal combustion engine according to a first mode of the present invention is now explained.

As shown in FIG. 1, a diesel engine (hereafter abbreviated to an engine) is provided with an exhaust turbocharger 7 including, but not limited to, an exhaust turbine 3 and a compressor 5 which is driven by a coaxial shaft common to the turbine 3 and the compressor 5; an intake air delivered from the compressor 5 of the exhaust turbocharger 7 streams through an intake air passage 9 and enters an intercooler 9; after the intake air is cooled in the intercooler 9, the flow rate of the intake air is controlled by an intake air throttle valve 13. Subsequently, the intake air streams into a combustion room after the intake air streams through an intake manifold 15, an intake port (intake-air-port) 17 provided at each cylinder, and an intake air valve of the engine.

Further, the engine 1 is provided with a fuel injection control device 19 which injects fuel into the combustion room by controlling fuel injection timing, fuel injection quantity and fuel injection pressure; by use of the fuel injection control device 19, the fuel of a predetermined quantity under a predetermined pressure is supplied to a fuel injection valve 21 at a predetermined timing.

Further, an EGR (Exhaust Gas Recirculation) passage 25 diverges from a part way of an exhaust gas passage 23; a part of the exhaust gas is cooled by an EGR cooler 27 and is charged into the downstream side of the intake air throttle valve 13 via an EGR valve (an EGR control valve) 29. The intake air throttle valve 13 is provided with a throttle valve control device circuit 31 so that the open-or-close behavior of the throttle valve 13 is controlled; the EGR valve 29 is provided with an EGR control device (an exhaust gas recirculation control device) 33 so that the open-or-close behavior of EGR valve is controlled.

An combustion gas burnt in the combustion room of the engine 1, namely, an exhaust gas 35 streams through an exhaust manifold 39 with which each exhaust gas port 37 provided at each cylinder merges as well as through an exhaust gas passage 23, toward the exhaust turbine 3; and, the exhaust gas drives the exhaust turbine 3 of the exhaust turbocharger 7 so as to be a power source of the compressor 5. Then, the exhaust gas streams into an exhaust gas after-treatment device (not shown) via the exhaust gas passage 23.

Into a control unit (ECU) 41, an engine speed signal is inputted from a pulse counter 43 connected to an engine speed sensor 42; and, a fuel injection quantity signal is inputted from the fuel injection control device 19. A detected signal from an intake air temperature sensor 44 provided at the intake manifold 15 is converted by an A/D converter 45 and inputted into the control unit; a detected signal from an intake air pressure sensor 46 is converted by an A/D converter 47 and inputted into the control unit; and, a detected (flow rate) signal from an air flow meter 48 is converted by an A/D converter 49 and inputted into the control unit.

In the next place, in consultation with a configuration block diagram of FIG. 3, the EGR control device is explained.

The EGR control device is provided with a feedback control unit 51 which outputs a feedback control command signal and a feed-forward control unit 53 which outputs a feed-forward control command signal.

The feed-forward control unit 53 computes a feed-forward control command signal 57 by use of a feed-forward control map 55 in which a target valve opening of the EGR valve 29 is set based on the engine speed and the fuel injection quantity (engine load) that are the variables related to the engine operation condition.

On the other hand, the feedback control unit 51 computes a feedback control command signal 65 by performing a feedback operation at a PID operation section 63 by use of a feedback control map 61 in which a feedback control target signal (target air excess ratio) in response to the engine operation condition is set based on the engine speed and the fuel injection quantity (engine load) that are the variables related to the engine operation condition.

The computation of the feedback control command signal 65 is performed as follows.

An air excess ratio estimating section 67 computes an actual air excess ratio based on the detected signals in relation to an air flow rate, an intake manifold pressure, an intake manifold temperature, an engine speed and a fuel injection quantity. This actual air excess ratio and the target air excess ratio are inputted into an adder-subtractor 69; based on the deviation thereof, in a PID operation section 63, operations in a proportional element (P), a derivative element (D) and an integral element (I) are executed; each operation result is inputted into an adder 71, where a feedback control command signal 65 is computed.

Further, the feed-forward control command signal 57 and the feedback control command signal 65 are inputted into an adder 73, from which an aggregated command signal 75 is outputted.

Further, when the feed-forward control command signal 57 and the aggregated command signal 75 are inputted into a maximum selection function-section (a selection unit) 77, where the greater signal is selected. When the greater signal is selected in the maximum selection function-section, a command signal corresponding to a closed side of the valve opening of the EGR valve 29 is selected.

Accordingly, when the feed-forward control command signal 57 is on the closed side in comparison with the aggregated command signal 75, the feed-forward control command signal 57 is selected. On the contrary, when the aggregated command signal 75 is on the closed side, the aggregated command signal 75 is selected. To be more specific, when the aggregated command signal 75 is on the closed side, the aggregated command signal 75 is eventually on a closed side in comparison with the feed-forward control command signal 57; thus, a selection is performed so that the command signal corresponding to an opened side in comparison with the feed-forward control command signal 57 is not outputted to the EGR valve.

The outputted signal selected as described above is subsequently inputted into a valve opening limiter 79 which is an EGR valve opening saturation control element 79. In this way, the output signal is obliged to stay within a limited level in order to protect the EGR valve 29. Further, based on an signal θ that has passed through the valve opening limiter 79, an EGR control valve command signal is computed and outputted to control the EGR control valve; the intake air throttle valve 13 command signal 13 is computed and outputted to control the throttle valve. The computation, namely, the conversion of command signals is performed based on the functions as depicted in FIG. 3(*b*) or equivalent relational formulae.

Figure 2:
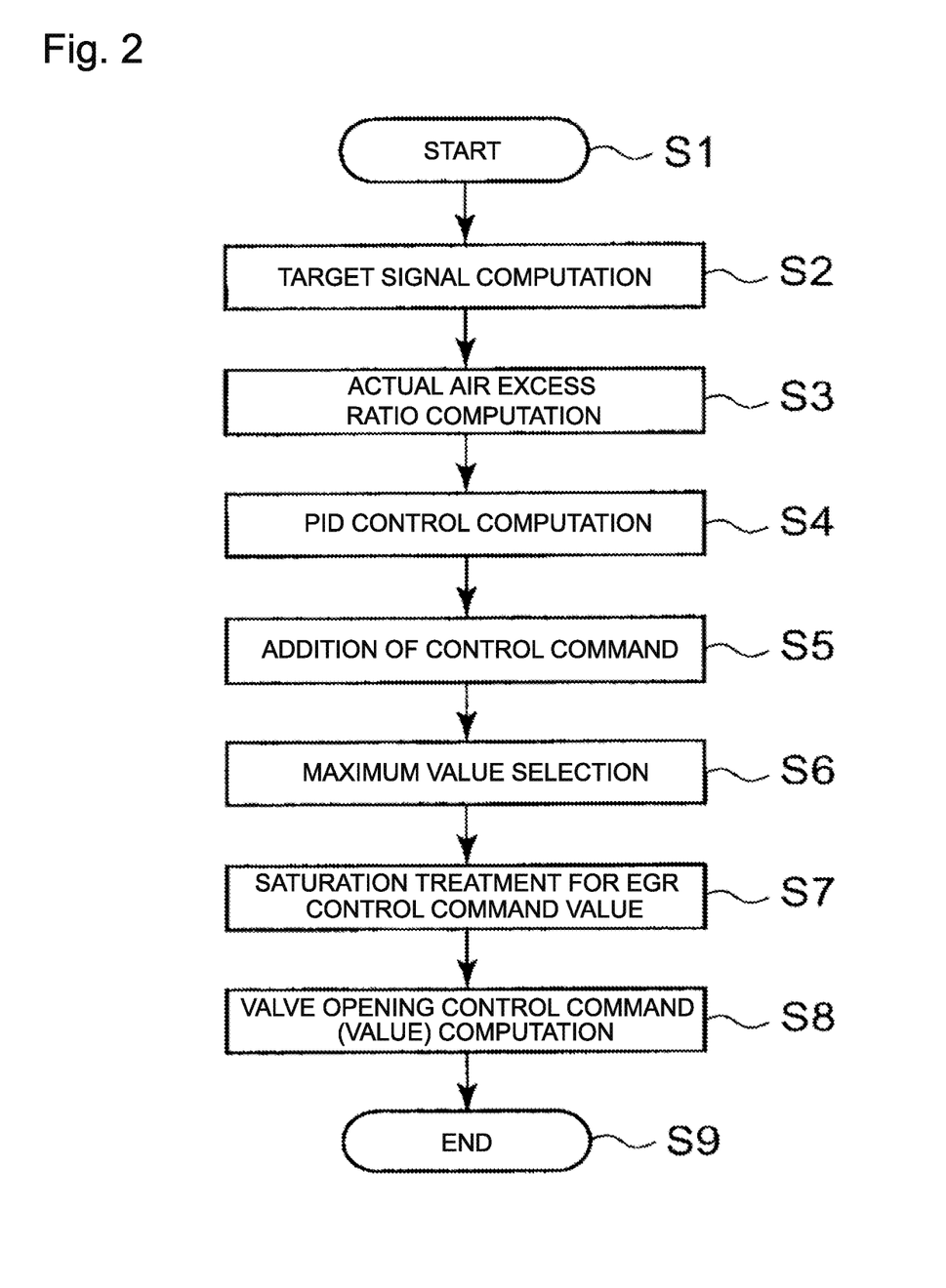
FIG. 2 shows a control flow chart of the first mode.

In the next place, based on the flow chart in FIG. 2, the flow of the control is explained.

First, when the control is started, in the step S2, a target signal is computed. In the computation of the target signal, the target valve opening for the EGR valve 29 is computed by use of the feed-forward control map 55 based on the engine speed and the fuel injection quantity (engine load); similarly, the target air excess ratio is computed by use of the feedback control map 61 based on the engine speed and the fuel injection quantity (engine load).

In the next step S3, by use of the air excess ratio estimating section 67, an actual air excess ratio is computed based on the detected signals of an air flow rate, an intake manifold pressure, an intake manifold temperature, an engine speed and a fuel injection quantity. In the following step S4, in the PID operation section 63, the PID operation is performed; in the step S5, by use of the adder 73, the summation regarding the control command signal is performed.

In the next step S6, in the maximum selection function-section 77, a command signal corresponding to a closed side of the valve opening of the EGR valve 29 is selected. In the following step S7, by use of the valve opening limiter 79, the saturation treatment for the EGR control command signal is performed so as to set a limit. In the step S8, the output signal θ of the valve opening limiter 79 is converted into the control command signal for the EGR valve 29 as well as the intake air throttle valve 13, each transformed control command signal being outputted. In the step S9, the flow of the control is finished.

In the first mode as configured above, by use of the maximum selection function-section 77 as a selection unit, out of
    the feed-forward control command signal 57 from the feed-forward control unit 53 and
    the aggregated command signal 75 obtained by adding the feedback control command signal 65 to the feed-forward control command signal 57,
    the control command signal by which the valve opening is on the closed side is selected so that the command signal corresponding to an opened side in comparison with the feed-forward control command signal 57 is not outputted. In this way, since the feed-forward control command signal 57 forms a limitation against an excessive opening, the EGR valve 29 is prevented from being opened than is necessary because of transient operation conditions, and the smoke can be prevented from being generated because of excessive recirculation of exhaust gas.

To be more specific, the feed-forward control command signal 57 forms a limitation level; thus, even if the feedback control command signal 65 overshoots under a transient condition and exceeds a feedback target control signal, the opening of the EGR valve is prohibited from being opened over the opening level determined by the feed-forward control command signal. Hence, the EGR control valve can be prevented from being widely opened so that the exhaust gas is recirculated more than necessary. Thus, the opening of the EGR valve is prevented from advancing toward the A-direction as shown in FIG. 11; and, the smoke generation can be prevented.

Figure 4A:
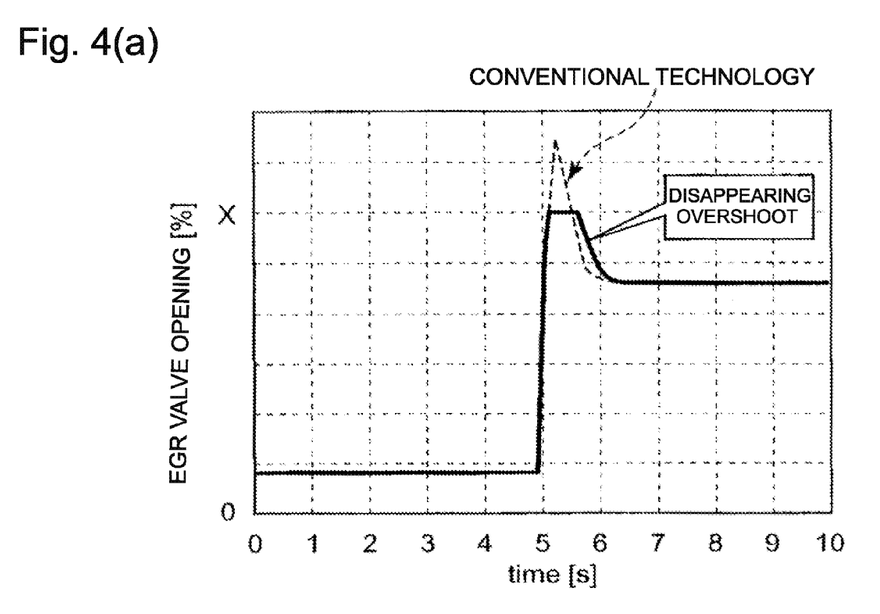
FIG. 4(a) shows a situation where an over-shoot phenomenon is prevented.

FIG. 4(*a*) shows a simulation example where an overshoot as explained above is prevented; FIG. 4(*a*) shows the situation of change of the valve opening, for instance, when there is an opening change signal as to the EGR valve 29 at a time point of 5 seconds. In this mode of the present invention, the feed-forward control command signal 57 is the valve opening X (%) of the EGR valve 29; hence, the valve opening does not exceed the valve opening X (%). In this way, it can be confirmed that the overshoot such as seen in the conventional technology can be prevented.

Further, in a case where an aggregated command signal 75 which is the addition of the feed-forward control command signal 57 and the feedback control command signal 65 is selected in the maximum selection function-section 77, the function section 77 outputs not simply the feedback control command signal 65 but the aggregated command signal as the addition of the feed-forward control command signal 57 and the feedback control command signal 65; thereby, the feed-forward control command signal 57 outputs an EGR valve opening command signal which is desirable for a steady condition. Accordingly, the responsiveness for a target opening can be enhanced.

Further, when the data of the feedback control map 61 in a low load operation zone is set so as to be intentionally changed, the maximum selection function-section 77 can be set so as to select only the feed-forward control command signal. Thus, two kinds of control units, namely, a control by the feedback control unit 51 in addition to a control only by the feed-forward unit 53 can be changed-over into each other with a simple control logic based on the engine load conditions.

As described above, by changing the setting data of the feedback control map 61, the change-over between the two kinds of control units can be executable in response to engine speeds and fuel injection quantities (engine loads). Further, by changing the setting data of the feed-forward control map 55, the limiting level for limiting the opening of the EGR valve 29 can be changed in response to engine speeds and fuel injection quantities (engine loads). In addition, as a matter of course, the setting data may be set at a constant level without being changed.

Figure 4B:
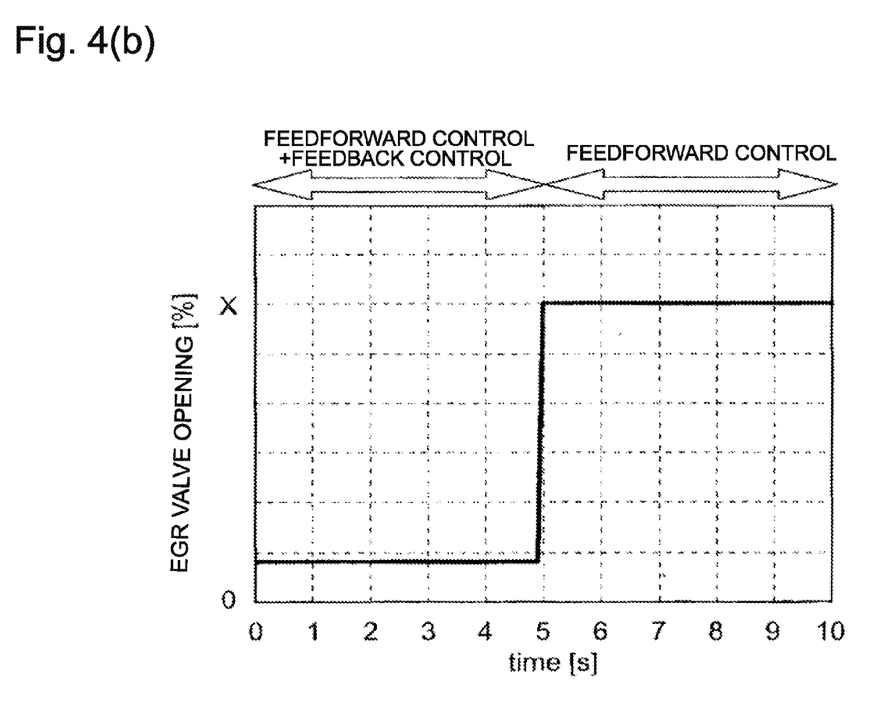
FIG. 4(b) shows a situation where one of two kinds of control units is changed into the other unit.

FIG. 4(*b*) shows a situation where one of two kinds of control units is changed into the other unit; in FIG. 4(*b*), there is an opening change signal at a time point of 5 seconds and the feed-forward control command signal 57 is set at a level corresponding to X (%). In this way, it can be confirmed that the opening of the valve does not exceed the level.

(Second Mode)

Figure 5:
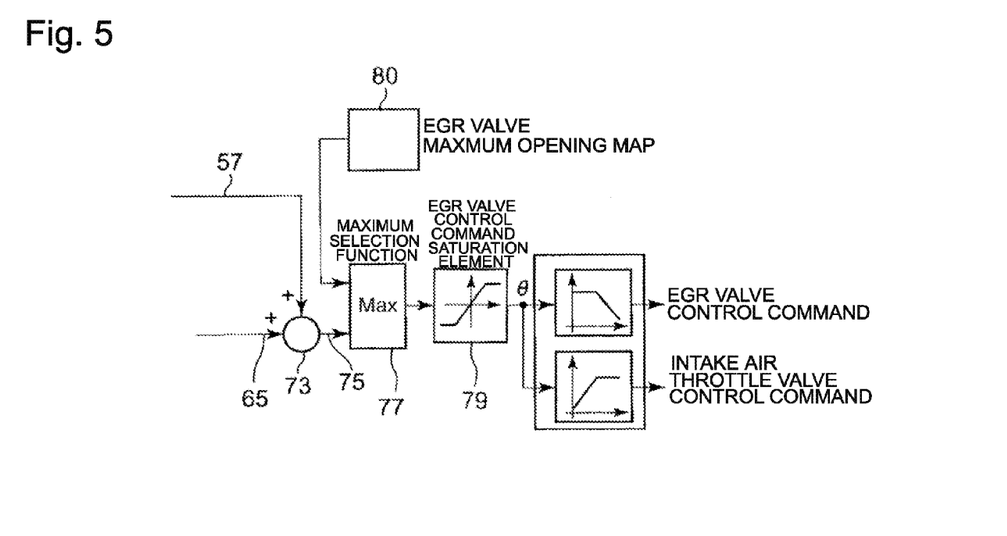
FIG. 5 shows an outline configuration of major parts according to a second mode.

In the next place, based on FIG. 5, a second mode of the present invention is explained.

Figure 3A:
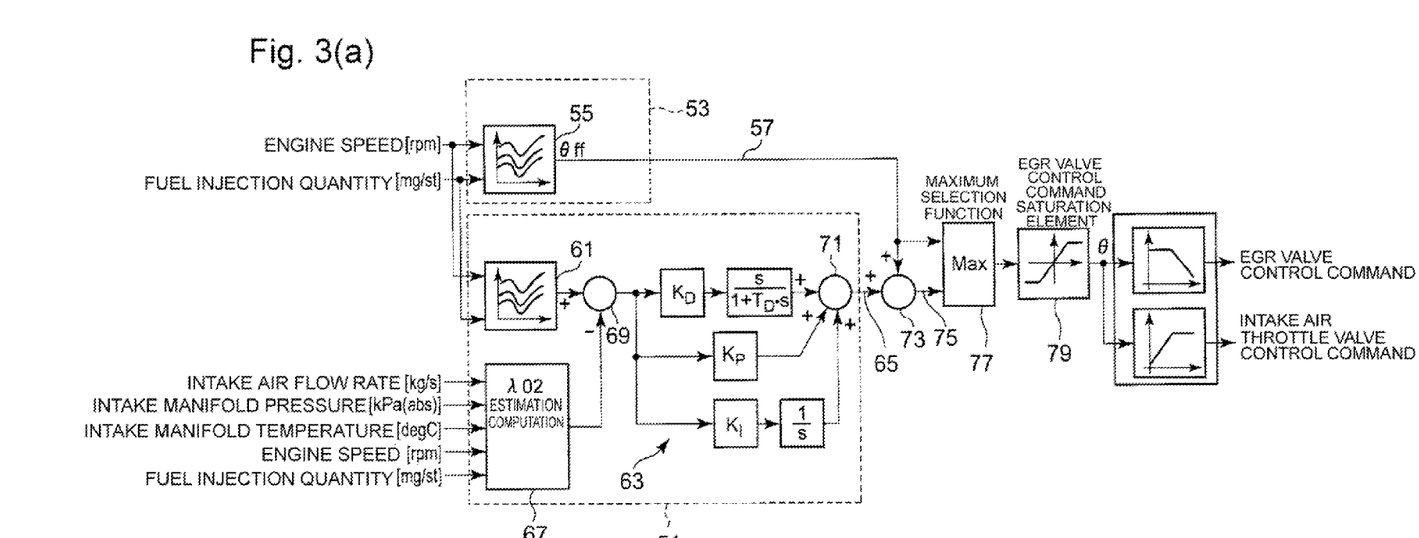
FIG. 3(a) shows a configuration block diagram of the first mode.
Figure 3B:
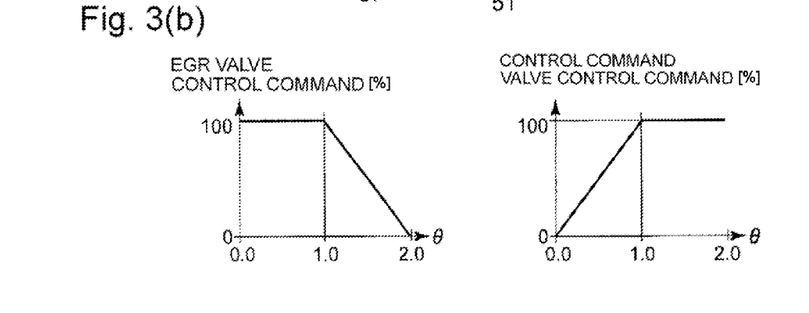
FIG. 3(b) is an explanation drawing regarding signal conversion.

As already explained, in the configuration block diagram in the first mode of FIG. 3(*a*), the feed-forward control command signal 57 and the feedback control command signal 65 are inputted into the adder (an adding unit) 73 and the aggregated command signal 75 is outputted; the aggregated command signal 75 and the feed-forward control command signal 57 are inputted into the maximum selection function-section 77. And, when the greater signal is selected in the maximum selection function-section 77, a command signal corresponding to a closed side of the valve opening of the EGR valve 29 is selected.

On the other hand, in a second mode of the present invention, as shown in FIG. 5, instead of the feed-forward control command signal 57, a valve opening command signal from an EGR valve maximum opening map 80 is inputted as a limiting signal which limits the maximum opening of the control valve of the EGR valve 29.

The EGR valve maximum opening map 80 is a map in which the maximum opening of the EGR valve is established based on the parameters of the engine operation conditions and the atmospheric conditions.

When the feed-forward control command signal 57 is used as the limiting signal as in the first mode, there may be a case where an appropriate limiting is not carried out in a case where an environmental condition greatly changes. For instance, in a case where the atmospheric temperature changes toward a higher level, the combustion temperature increases in response to the atmospheric temperature increase and the NOx emission amount increases. Hence, it becomes necessary to establish the limiting level of the maximum opening of the EGR valve at an opened side; however, since the control command signal from the feed-forward control unit is established at a level based on a standard atmospheric condition, the feed-forward control command signal 57 cannot sufficiently work under such a change of the environment condition.

In the second mode, by establishing the limiting level by use of the EGR valve maximum opening map 80 which is configured in response to the engine operation conditions and the environmental conditions, the overshoot phenomenon can be surely prevented while the NOx emission amount can be constrained, even if there may be a great change of the environmental condition such as a change of an atmospheric temperature or pressure.

(Third Mode)

Figure 6:
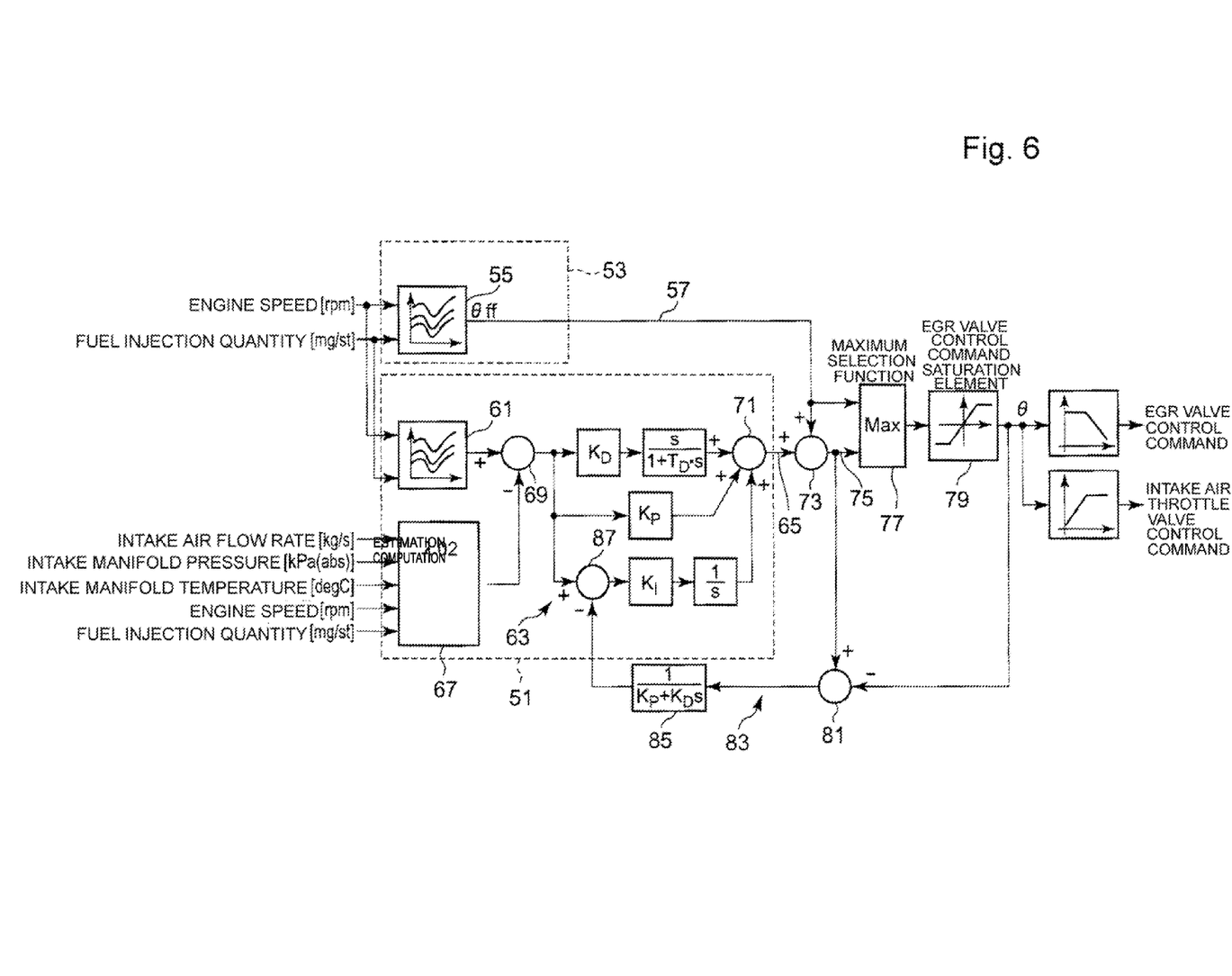
FIG. 6 shows a configuration block diagram of a third mode.
Figure 7:
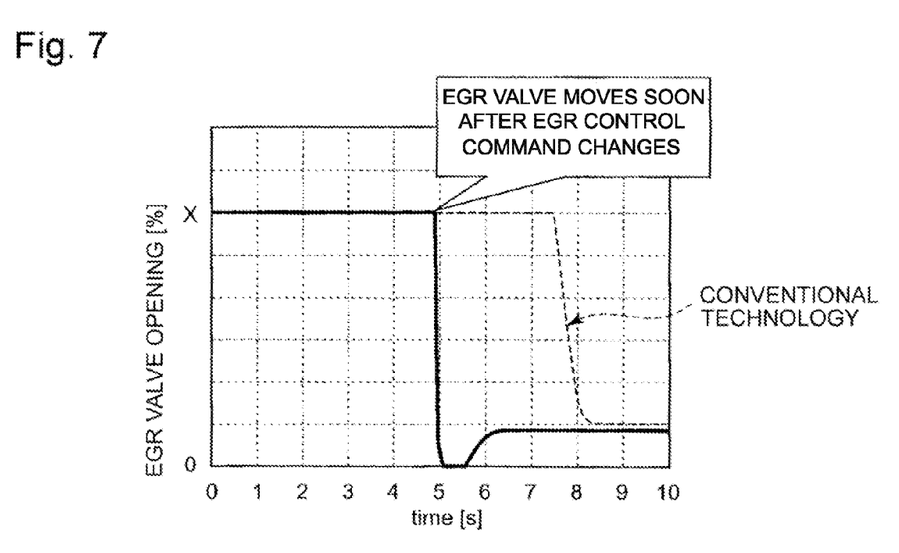
FIG. 7 shows a simulation confirmation according to the third mode.

In the next place, based on FIGS. 6 and 7, a third mode of the present invention is explained.

FIG. 6 of the configuration block diagram according to the third mode is different from FIG. 3(a) of the configuration block diagram according to the first mode in that an auto-tuning PID 83 is provided in the third mode; whereby, the auto-tuning PID 83 performs an auto-tuning for the feedback control unit 51 based on a deviation between the output signal from the valve opening limiter 79 and the output signal from the adder 73. Thereby, the output signal from the valve opening limiter 79 and the output signal from the adder 73 are inputted into an adder-subtractor 81 and the deviation is obtained as an output signal from the adder-subtractor 81; the output signal from the adder-subtractor 81 is inputted into an operation element 85 of the auto-tuning PID 83, and the output of the operation element 85 is inputted into an adder-subtractor 87. Further, the output of the adder-subtractor 87 is inputted into an integral operation section. The configuration other than described above is the same as the configuration of the first mode.

In addition, in a case where the configuration of the PID operation section 63 of the feedback control unit 51 is not similar to a configuration as depicted in FIG. 6 and is integrated into a whole configuration such as modeled in a form $K_p(1+K_i/s+K_D{*}s)$ or $K_p(1+K_i/s+K_D{*}s/(1+T_D{\cdot}s))$, the block $(1/(K_p+K_D{*}s))$ may be changed into the block $(1/(K_p+K_pK_D{\cdot}s))$. Further, when a PI control is performed, $K_D$ may be set at 0 ($K_D=0$).

FIG. 7 shows a simulation confirmation result. Since the feed-forward control command signal 57 is the valve opening of the EGR valve 29 and is limited to the opening level X %, it can be confirmed that the valve opening quickly follows the feed-forward control command signal 57 according to the third mode. For instance, at the time point of 5 seconds, the target opening signal suddenly changes; nevertheless, the valve opening follows the control command almost without delay according to the third mode, whereas there is a delay between the command signal and the opening as a response, according to the conventional technology.

According to the third mode, by providing the auto-tuning PID 83 as a wind-up countermeasure (an input saturation countermeasure) for the feedback control unit 51, the integrator in the PID operation section 63 of the feedback control unit 51 is prevented from continuing to accumulate the integrated results while the maximum selection function-section 77 selects the feed-forward control command signal 57.

In this way, the tracking performance in a case where the target signal level of the feedback control is changed can be enhanced, and the cleaning performance regarding the exhaust gas under a transient operation can be prevented from being spoiled.

Further, even in a case where the control command signal for the EGR valve 29 sticks to an end of the opening range of the EGR valve 29, namely, a limit level of the valve opening limiter 79, the integrator in the PID operation section 63 is prevented from continuing to accumulate the integrated results. In this way, the tracking performance in a case where the target signal level of the feedback control is changed can be enhanced, and the cleaning performance regarding the exhaust gas under a transient operation can be prevented from being spoiled.

(Fourth Mode)

Figure 8:
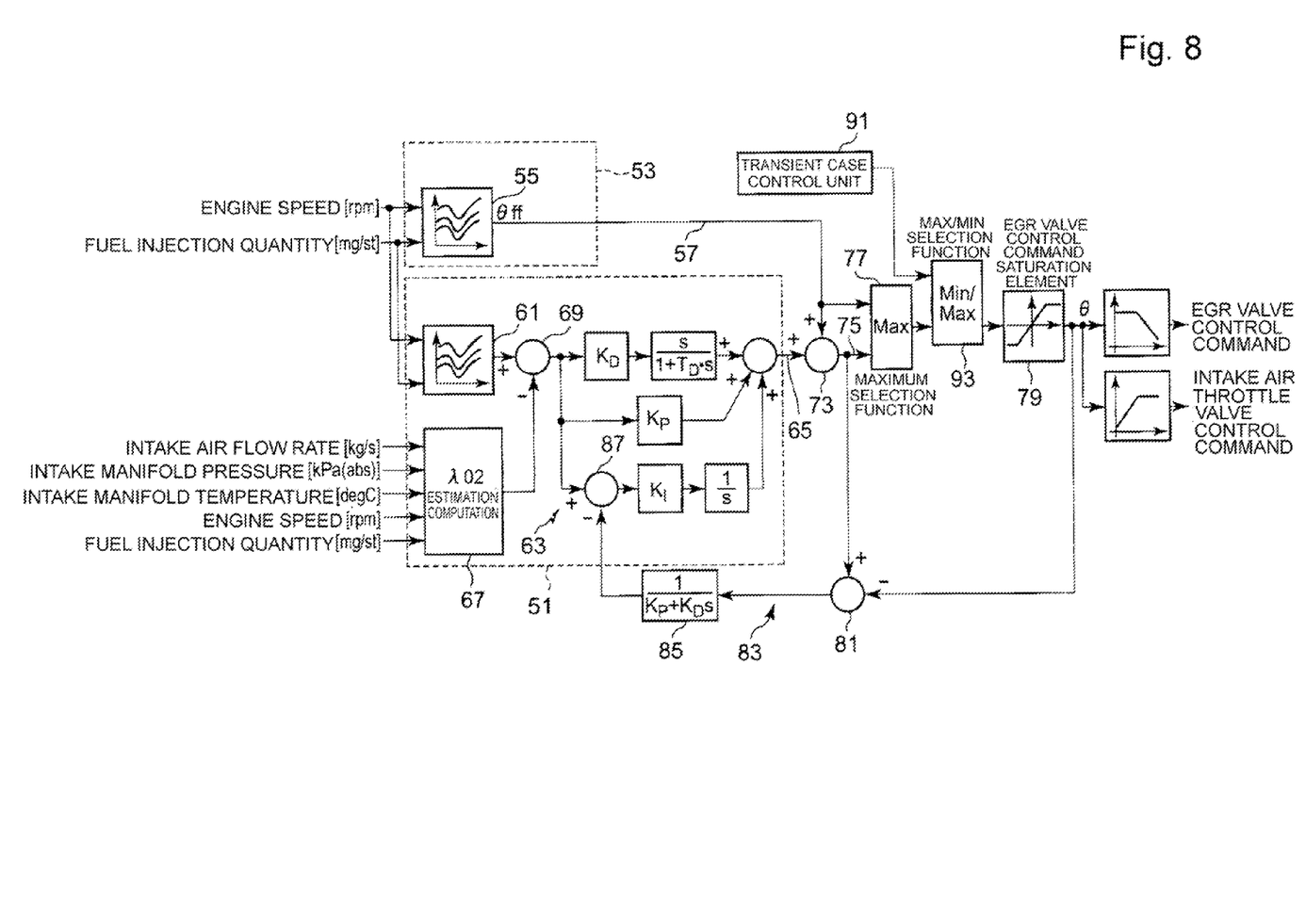
FIG. 8 shows a configuration block diagram of a fourth mode.
Figure 9:
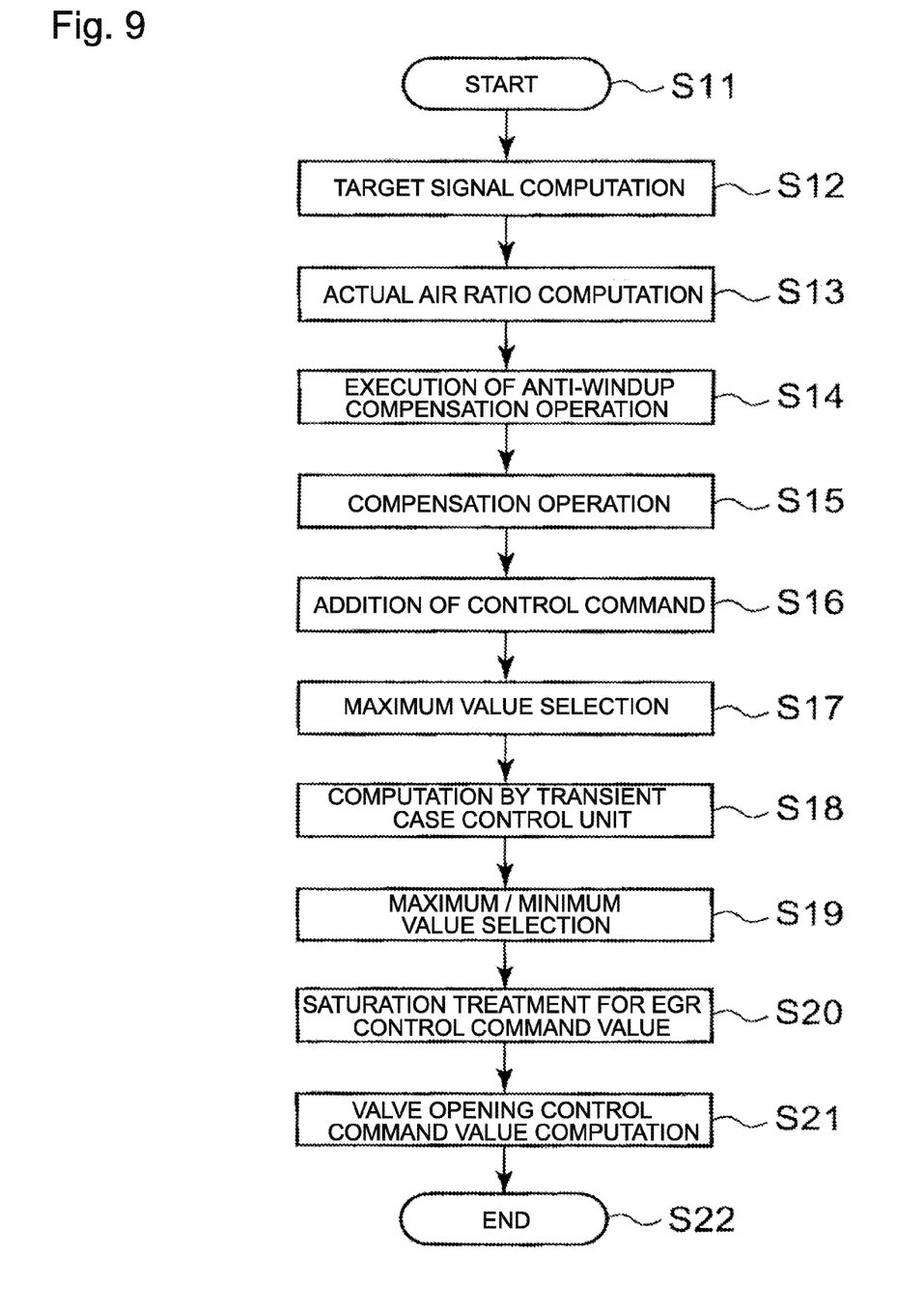
FIG. 9 shows a control flow chart of the fourth mode.
Figure 10:
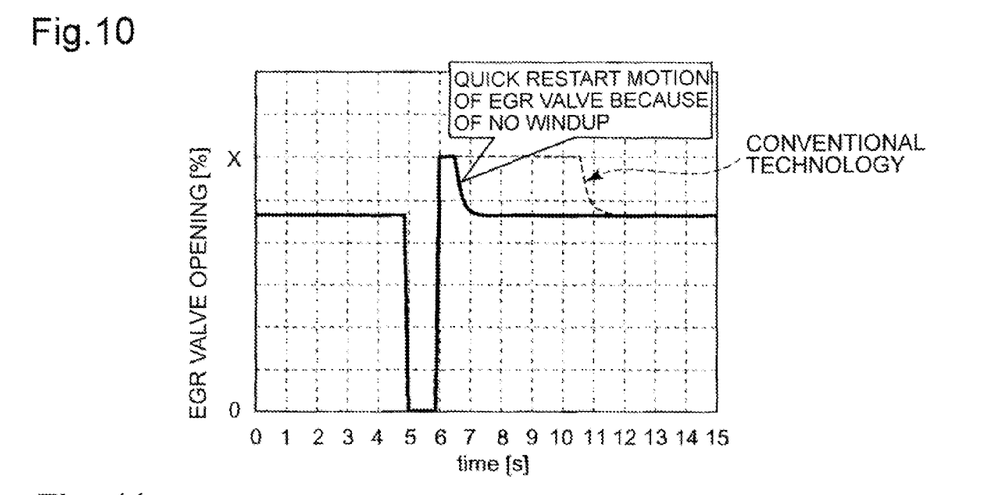
FIG. 10 shows a simulation confirmation according to the fourth mode.

In the next place, based on FIGS. 8 to 10, a fourth mode of the present invention is explained.

The fourth mode is formed by adding a transient case control unit 91 as an additional EGR control function device to the configuration block diagram FIG. 6 of the third mode.

Between the valve opening limiter 79 and the maximum selection function-section 77, a transient case selection unit 93 is provided; the transient case selection unit 93 selects the maximum value (greater signal) or the minimum value (smaller signal) out of the output signal from the transient case control unit 91 and the output signal from the maximum selection function-section 77; and, the selected value (signal) is outputted toward the valve opening limiter 79. Except these points as described, the configuration of the fourth mode is the same as the configuration of the first mode.

In a case where the engine speed or the engine load increases, in order to constrain the smoke generation during the transient engine operation, this transient case control unit 91 controls the EGR valve 29 so that the EGR valve 29 is fully closed or the opening is placed at a minimum level, for a certain duration of time.

Further, based on FIG. 9, the control flow according to the fourth mode is now explained.

The steps S11 to S13 are the same as the steps S1 to S3 in the first mode. In the step S14, an anti-windup operation is executed. The output signal from the valve opening limiter 79 and the output signal from the adder 73 are inputted into the adder-subtractor 81; and, the deviation of the signals is operated by the operation element 85 of the auto-tuning PID 83. The operation result by the operation element 85 is subtracted from the input signal for the integral operation section at the adder-subtractor 87 so that the integrator in the PID operation section 63 is prevented from continuing to accumulate the integrated results.

In the next place, the steps S15 to S17 are the same as the steps S4 to S6 in the first mode. In the step S18, the signal from the transient case control unit 91 is operated; in the following step S19, one of the maximum value and the minimum value out of the operation result of the signal from the transient case control unit and the output signal from the maximum selection function-section 77 is selected. The following steps S15 to S17 are the same as the steps S7 and S8 in the first mode.

According to the fourth mode, also when the transient case control unit 91 is provided, the auto-tuning PID 83 as a windup countermeasure (an input saturation countermeasure) as explained in the third mode is arranged in a case where the condition under which the transient case control unit 91 controls the EGR valve 29 is released. Accordingly, the windup (an input saturation) is prevented from occurring. Therefore, an adverse effect due to an addition of an optional logic element such as the transient case control unit 91 can be avoided.

To be more specific, under a condition that the transient case control unit 91 is provided, in order to constrain the smoke generation during the transient operation, even when a control logic by which the EGR control valve is fully closed for a certain duration of time or a control logic by which the opening of the EGR control valve is placed at a minimal level is optionally added, the adverse effect due to the auto-tuning PID 83 during the transient situation where the control by the transient case control unit 91 is released is avoided. Thus, the tracking performance as well as the reliability of the EGR control valve can be enhanced.

FIG. 10 shows a confirmation result of a simulation. In the time span from 5 to 6 seconds, the transient case control unit 91 which forcefully fully-closes the opening of the EGR valve is operated; afterwards, the control by the transient case control unit 91 is released. The transient situation thereby of the valve opening of the EGR valve 29 is depicted in FIG. 10. Since there is no occurrence of a windup phenomenon, the valve opening immediately moves; and, it can be confirmed that the valve opening increases up to the limit level of the valve opening X % of the feed-forward control command signal and returns to the level of the initial condition.

In addition, it has been explained that, in the third and fourth modes, the auto-tuning PID 83 or the transient case control unit 91 is provided based on the first mode. It goes without saying that the auto-tuning PID 83 or the transient case control unit 91 may be provided based on the second mode.

INDUSTRIAL APPLICABILITY

According to the present invention, the overshoot behavior and the like of an EGR valve can be prevented; the smoke generation due to an excessive opening of the EGR valve can be prevented; and, the tracking performance as well as the reliability of the EGR valve can be enhanced. Hence, the present invention suitably applied to an exhaust gas recirculation control device of an engine.

The invention claimed is:

1. An exhaust gas recirculation control device of an internal combustion engine, the device comprising:
    an EGR control valve which controls the flow rate of EGR gas and is provided in an EGR gas passage connecting an exhaust gas passage to an intake air passage;
    a feedback control unit which outputs a feedback control command signal to control the opening of the EGR control valve, in response to the operation conditions of the internal combustion engine; and
    a feed-forward control unit which outputs a feed-forward control command signal,
    wherein
    the exhaust gas recirculation control device comprises:
        an adding unit which adds a control command signal from the feed-forward control unit to a control command signal from the feedback control unit; and
        a selection unit which compares an added value obtained by the adding unit with a limitation signal for the maximum opening of the EGR control valve, and selects the command signal by which the valve opening of the EGR control valve is brought to a closed side,
    wherein
    the command signal by which the valve opening of the EGR control valve is brought to an opened side is not outputted.

2. The exhaust gas recirculation control device of an internal combustion engine according to claim 1, wherein
    the control command signal from the feed-forward control unit is inputted, as a limitation signal for the maximum opening of the EGR control valve, into the selection unit.

3. The exhaust gas recirculation control device of an internal combustion engine according to claim 1, wherein
    a limitation signal for the maximum opening of the EGR control valve is of a value calculated by use of an EGR valve maximum opening map which is set in response to engine operation conditions and environment conditions.

4. The exhaust gas recirculation control device of an internal combustion engine according to claim 1, wherein
    the feedback control command signal is which is set by a PID operation based on a calculated air excess ratio of the internal combustion engine as well as based on a target air excess ratio as a feedback control target value previously established in response to engine operation conditions.

5. The exhaust gas recirculation control device of an internal combustion engine according to claim 4, wherein:
    the device comprises a valve opening limiter of the EGR control valve; and
    the feedback control unit is provided with an auto-tuning PID unit based on the deviation between the output signal of the valve opening limiter and the output signal of the adding unit.

6. The exhaust gas recirculation control device of an internal combustion engine according to claim 5, wherein:
    the device comprises a transient case control unit which controls the EGR control valve so that the EGR control valve is closed toward a minimal opening or a fully closed condition for a certain period during a transient operation; and
    a transient case selection unit which selects one of the output signal of the selection unit and the output signal of the transient case control unit so that the selected signal is outputted to valve opening limiter.

* * * * *